(No Model.)
P. BARRY.
SPRING CONNECTION FOR VEHICLES.
No. 265,914.  Patented Oct. 10, 1882.
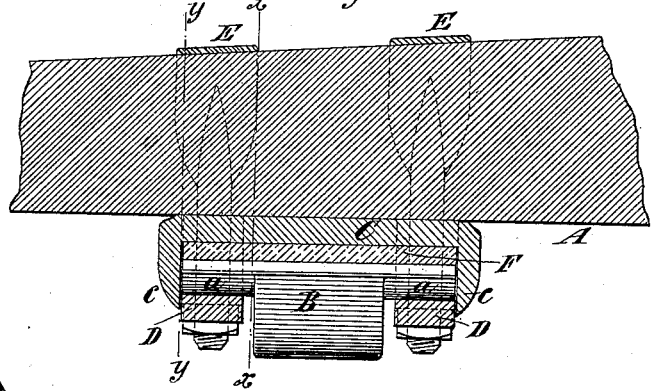
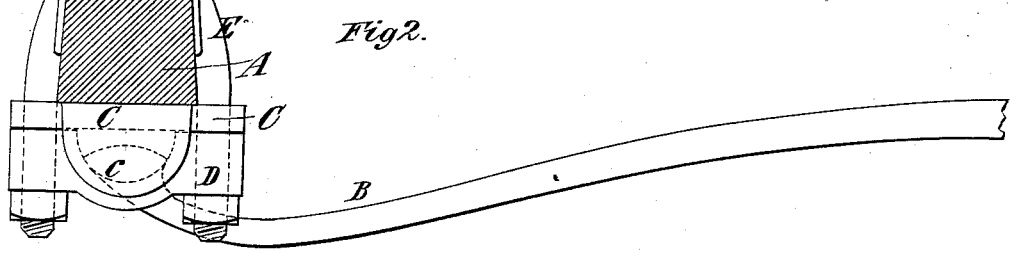
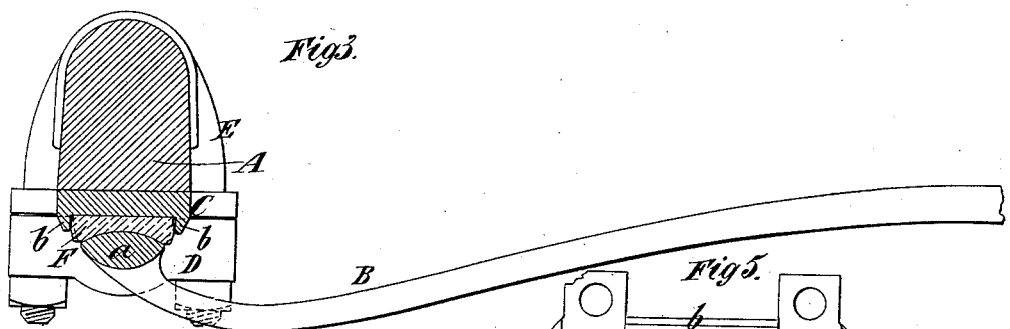
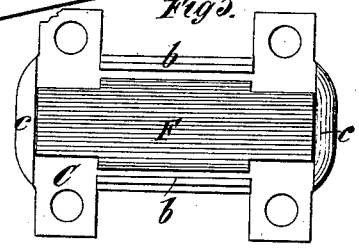
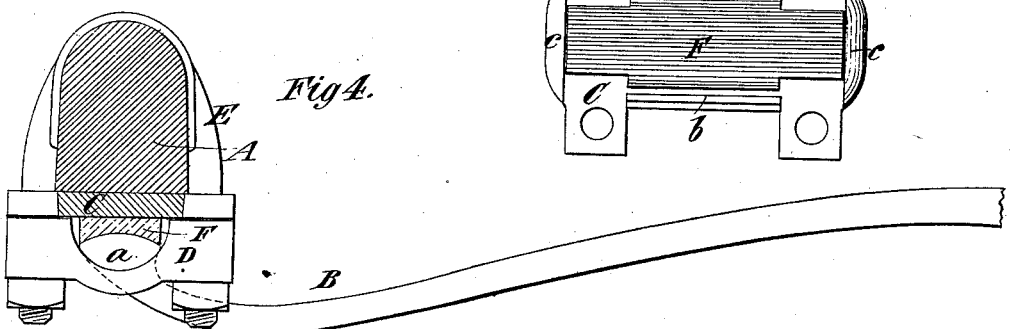
Witnesses:
Fredk Haynes
Ed L. Moran
Inventor:
Peter Barry
by his Attorneys
Brown & Brown

UNITED STATES PATENT OFFICE.

PETER BARRY, OF NEW YORK, N. Y., ASSIGNOR OF ONE-HALF TO JOHN W. BRITTON, HENRY BREWSTER, AND CHANNING M. BRITTON, ALL OF SAME PLACE.

SPRING-CONNECTION FOR VEHICLES.

SPECIFICATION forming part of Letters Patent No. 265,914, dated October 10, 1882.

Application filed April 10, 1882. (No model.)

*To all whom it may concern:*

Be it known that I, PETER BARRY, of the city and county of New York, in the State of New York, have invented a new and useful Improvement in Spring-Connections for Wagons and other Vehicles, of which the following is a specification.

My invention relates to spring-couplings for side-bar vehicles, in which the spring is provided with lugs projecting from opposite sides, which are secured between a base-plate and bearings or caps attached together to the under side of the side bar.

The invention consists in a novel construction of and manner of combining the spring-lugs with their bearings or caps, whereby provision is afforded for the movement of the lugs in their bearings as the spring elongates without spreading the side bars.

In the accompanying drawings, Figure 1 represents a longitudinal section of a portion of a side bar and my improved coupling. Fig. 2 represents a side view of a portion of the spring and coupling and a transverse section of the side bar. Fig. 3 represents a section on the dotted line *x x*, Fig. 1. Fig. 4 represents a similar section on the dotted line *y y*, Fig. 1; and Fig. 5 represents an inverted plan of one of the plates of the coupling and a rubber cushion which I may employ.

Similar letters of reference designate corresponding parts in all the figures.

A designates the side bar of a wagon or other vehicle, and B designates a semi-elliptical spring, whereon the body is to be supported, and the ends of which are coupled to the side bars. The spring is provided at its end with lugs *a*, projecting from its opposite sides, and these lugs are here shown as approximately elliptical in their transverse section. The upper sides of the lugs need not be of any particular curvature, or, indeed, they may be flat.

The coupling is composed essentially of a clip-plate or base-plate, C, applied to the under side of the side bar, A, two bearings or caps, D, upon which the lugs *a* rest and are supported, and two clips, E, which embrace the cross-bar and secure the plate C and bearings D in place on the side bar. The bearings or caps D are provided in their upper side with concave recesses, wherein the lugs *a* rest, and the curved surface of the bearings is an arc having the same radius as the arc-shaped under side of the lugs *a*, but of greater length, so that the arc-shaped surface of the bearing extends beyond the arc-shaped under surface of the lug on each side.

F designates a rubber cushion, interposed between the top of the lugs and the plate C, but the cushion may be dispensed with. The portion of the plate C between the caps or bearings D is provided with downwardly-projecting lips or flanges *b*, which keep the rubber cushion in place, and the portion of the cushion extending through the bearings is narrower than the cavity in the bearings, as shown in Fig. 4, so that the cushion may expand laterally as it is compressed and reduced in thickness.

The base or clip plate C may have downwardly-projecting flanges *c* at the ends, which lap over the ends of the lugs *a* and prevent lateral shifting of the spring.

The essential feature of the invention consists in making the arc-shaped surface of the bearings D longer than the arc-shaped under surfaces of the lugs *a*, because, then, as the load comes on the spring and it elongates the lugs can slide freely on the bearings and obviate the spreading of the side bars. The same result could not be attained with round lugs entirely filling the bearings D, unless they were made of such large size that the couplings would be clumsy and impracticable.

What I claim as my invention, and desire to secure by Letters Patent, is—

The combination, with the spring provided with the lugs *a*, which are arc-shaped on their under sides, of the caps or bearings D, having arc-shaped surfaces, to which said lugs are fitted, and which are longer than the arc-shaped under sides of said lugs, substantially as and for the purpose specified.

PETER BARRY.

Witnesses:
W. A. OSTMIRE,
J. W. HADEN, Jr.